J. H. RAND & J. H. RAND, Jr.
ACCOUNT BOOK.
APPLICATION FILED APR. 8, 1914.
1,151,820.
Patented Aug. 31, 1915.
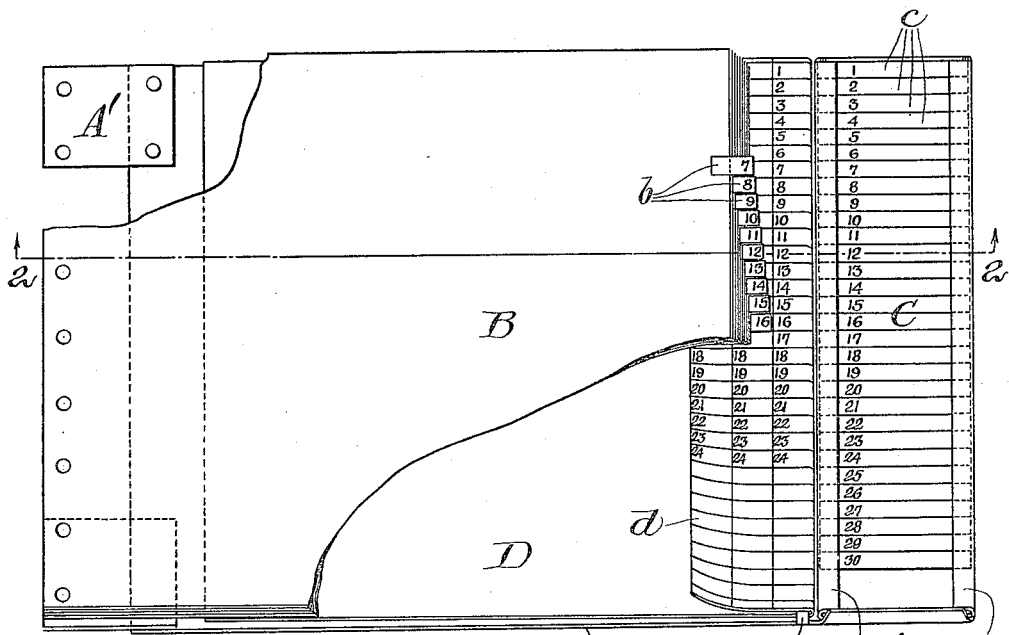
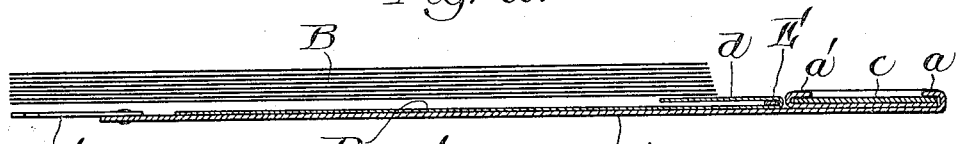
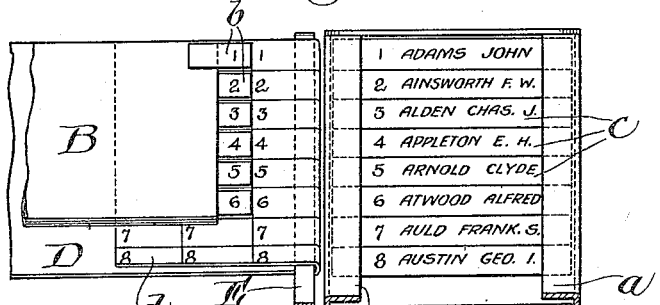

UNITED STATES PATENT OFFICE.

JAMES H. RAND AND JAMES H. RAND, JR., OF NORTH TONAWANDA, NEW YORK.

ACCOUNT-BOOK.

1,151,820.  Specification of Letters Patent.  Patented Aug. 31, 1915.

Application filed April 8, 1914. Serial No. 830,509.

*To all whom it may concern:*

Be it known that we, JAMES H. RAND and JAMES H. RAND, Jr., citizens of the United States, and residents of North Tonawanda, in the county of Niagara and State of New York, have invented new and useful Improvements in Account-Books, of which the following is a specification.

This invention relates to account books, and more particularly to bank ledgers, and its object is to provide an improved ledger and index, combined with an adjustable and removable sheet for receiving check marks or other memoranda to impart information and make a record of matters pertaining to the several accounts kept in the book.

The principal utility of the invention is to enable the bookkeeper to make check marks on the adjustable sheet appropriate to the several accounts indicating those accounts in which transactions have taken place during the day, and then to shift the sheet to bring a fresh surface into view for the same purpose each successive day for a given period, say a month, the sheet being provided with a series of spaces or columns, one for each day of the selected period of time.

Other features will hereinafter be described and particularly pointed out in the claims.

In the accompanying drawings which illustrate one embodiment of the invention, Figure 1 is a perspective view, partly broken away, of a section of a bank ledger containing the invention; Fig. 2 is a section on line 2—2 of Fig. 1; and Fig. 3 is a plan view, enlarged, partly in section, showing a portion of the ledger.

While the invention is applicable to books generally, whether loose leaf books or bound books, it is preferably used in books of the loose leaf type, and the ledger selected for the purpose of illustration is a loose leaf ledger.

The ledger is preferably divided into sections, each comprising a leaf A of stiff material, and a series or group of ledger leaves or account leaves B made of paper. The book may contain as many similar sections as desired, one section only being illustrated in the drawings. The divider and indicator leaf A is preferably made of sheet metal, and is provided with lugs A' for binding the leaf into a suitable loose leaf binder, said lugs being made of thin, flexible, resilient sheet metal, such as spring steel or brass, and riveted or otherwise secured to the edge of the leaf A.

The overlying account leaves B terminate short of the edge of the stiff leaf A, leaving a projecting margin for the index or indicator column C, and to expose a column of the checking sheet. The index column is at the free margin of the leaf A, and consists of a series of slips or cards $c$ for the names of depositors, or other titles of the accounts, removably held at their ends by oppositely facing guide channels. Said channels are formed by bending over the free edge of the sheet metal leaf A, as shown at $a$, to form the inwardly facing channel, and securing to the leaf A a parallel strip of sheet metal $a'$ bent to form the outwardly facing channel. Said channels define the borders of the index column, and together constitute the holder for the index or indicator slips. Between the index slip holder and the free edges of the ledger leaves B is a space, which may be termed a checking space, in which the checking sheet is exposed. Closely adjacent to the slip holder there is a bar E secured to the leaf A at top and bottom and raised from the surface of the leaf sufficiently to enable the checking sheet to pass underneath it. The checking sheet D lies on the indicator leaf A underneath the account leaves B, and passes underneath the bar E and is again folded back over said bar, the folded edge $d$ being also tucked under the leaves B, both to hold it in place and to get the part not in use out of the way.

The index slips $c$ are preferably numbered in sequence as shown, and the ledger leaves carry tabs $b$ numbered to correspond to the index slips, each ledger leaf containing the account of the depositor, named on the correspondingly numbered index slip. The checking sheet is ruled and divided into columns, of which there may be as many as desired within the limits of the size of the sheet. A suitable number of columns is 31, so that a sheet may serve for each day of any month. The ruled spaces of each column on the checking sheet are also numbered to correspond to the numbering on the index slips and the ledger leaf index tabs. Whenever an account has changed during the day a check or similar mark is made in the appropriate place on the exposed column of the checking sheet, so that at the end of the day's business the column for that day will show in which accounts transactions have taken place. For the next day the checking sheet D is pulled forward the distance of one column and again folded over the bar E, and so on from day to day, shifting fresh surfaces successively into view in the checking space. Thus, not only is the checking sheet conveniently held in position with provision for shifting new surfaces successively into position, but the sheet as a whole when removed constitutes a permanent record for the period which it covers.

We claim:—

1. In an account book, an indicator leaf of stiff material having at its free margin a holder adapted to hold index slips, a group of account leaves extending from the bound edge part way across said indicator leaf, the free edges of said account leaves terminating short of said index slip holder to leave a checking space between said holder and said account leaves, a checking sheet, a part of the surface of which is exposed in said checking space between the slip holder and the account leaves, and means to hold said checking sheet adjustably on the indicator leaf whereby said checking sheet may be shifted in its said holding means to bring successive fresh surfaces of said checking sheet into position in said checking space.

2. In an account book, an indicator leaf of stiff material having at its free margin a holder adapted to hold index slips, a group of account leaves extending from the bound edge part way across said indicator leaf, the free edges of said account leaves terminating short of said index holder to leave a checking space between said holder and said account leaves, a checking sheet, a part of the surface of which is exposed in said checking space between the slip holder and the account leaves, said checking sheet being folded upon itself and both ends extending under the account leaves, and means to hold the checking sheet on the indicator leaf and to permit the sheet to be shifted to bring successive fresh surfaces into position in said checking space.

3. In an account book, an indicator leaf of stiff material having at its free margin a holder adapted to hold index slips, a group of account leaves extending from the bound edge part way across said indicator leaf, the free edges of said account leaves terminating short of said index slip holder to leave a checking space between said holder and said account leaves, a bar secured to the indicator leaf alongside of the slip holder, and a checking sheet passing underneath said bar and folded over the same, whereby successive columns on said sheet may be shifted into exposed position in said checking space.

4. In an account book, an indicator leaf of stiff material having at its free margin a holder adapted to hold index slips, a group of account leaves extending from the bound edge part way across said indicator leaf, the free edges of said account leaves terminating short of said index slip holder to leave a checking space between said holder and said account leaves, a bar secured to the indicator leaf alongside of the slip holder, and a checking sheet lying on said indicator leaf underneath said account leaves, passing under said bar and folded back over the same, with its folded edge underneath the account leaves, whereby said checking sheet may be shifted to expose successive columns on said sheet in said checking space.

5. In an account book, a leaf of stiff material, a group of account leaves overlying said stiff leaf and terminating short of the edge thereof to leave a projecting margin, a bar secured to said projecting margin, and a sheet passing underneath said bar and folded over the same, said sheet being shiftable on said bar whereby fresh surfaces of the sheet may be successively exposed on said projecting margin.

Signed by us at North Tonawanda, New York, this 1st day of April 1914.

JAMES H. RAND.
JAMES H. RAND, Jr.

Witnesses:
EMMA VOELKER,
ELISABETH MAC LAREN.